(12) United States Patent
Fujii

(10) Patent No.: US 8,341,388 B2
(45) Date of Patent: Dec. 25, 2012

(54) INFORMATION PROCESSING APPARATUS AND SETUP PROGRAM EXECUTION METHOD

(75) Inventor: Natsuko Fujii, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 342 days.

(21) Appl. No.: 12/756,485

(22) Filed: Apr. 8, 2010

(65) Prior Publication Data

US 2010/0268924 A1 Oct. 21, 2010

(30) Foreign Application Priority Data

Apr. 16, 2009 (JP) ................................. 2009-100212

(51) Int. Cl.
*G06F 9/00* (2006.01)
(52) U.S. Cl. .......................................................... 713/1
(58) Field of Classification Search ........................ 713/1
See application file for complete search history.

(56) References Cited

U.S. PATENT DOCUMENTS

| 5,428,790 | A  | * | 6/1995  | Harper et al. ................. 713/322 |
| 7,139,850 | B2 | * | 11/2006 | Amemiya et al. .............. 710/48   |
| 2006/0064752 | A1 | * | 3/2006 | Wang et al. ..................... 726/19 |
| 2007/0124588 | A1 | * | 5/2007 | Tsuji et al. ..................... 713/168 |
| 2009/0160800 | A1 | * | 6/2009 | Liu et al. ....................... 345/173 |

FOREIGN PATENT DOCUMENTS

| JP | 05-027952   | 2/1993  |
| JP | 2000-298579 | 10/2000 |
| JP | 2002-041176 | 2/2002  |
| JP | 2005-321977 | 11/2005 |
| JP | 2007-305039 | 11/2007 |

OTHER PUBLICATIONS

JP 2005-321977—Machine Translated.*
Japanese Office Action for Japanese Patent Application No. 2009-100212 Mailed on May 24, 2011.
Japanese Office Action for Japanese Patent Application No. 2009-100212 Mailed on Jan. 25, 2011.

* cited by examiner

*Primary Examiner* — Chun Cao
*Assistant Examiner* — Scott Snyder
(74) *Attorney, Agent, or Firm* — Turocy & Watson, LLP

(57) ABSTRACT

According to one embodiment, an information processing apparatus includes a display unit, a touch panel, a BIOS storage unit, and a setup program execution unit. The display unit displays various kinds of information. The touch panel is installed on a display screen of the display unit and used for input corresponding to a contact operation. The BIOS storage unit stores a BIOS (basic input/output system) to execute startup of an operating system. The setup program execution unit executes a setup program for the BIOS in response to that an input from the touch panel is detected during the execution of the startup based on the BIOS.

9 Claims, 5 Drawing Sheets

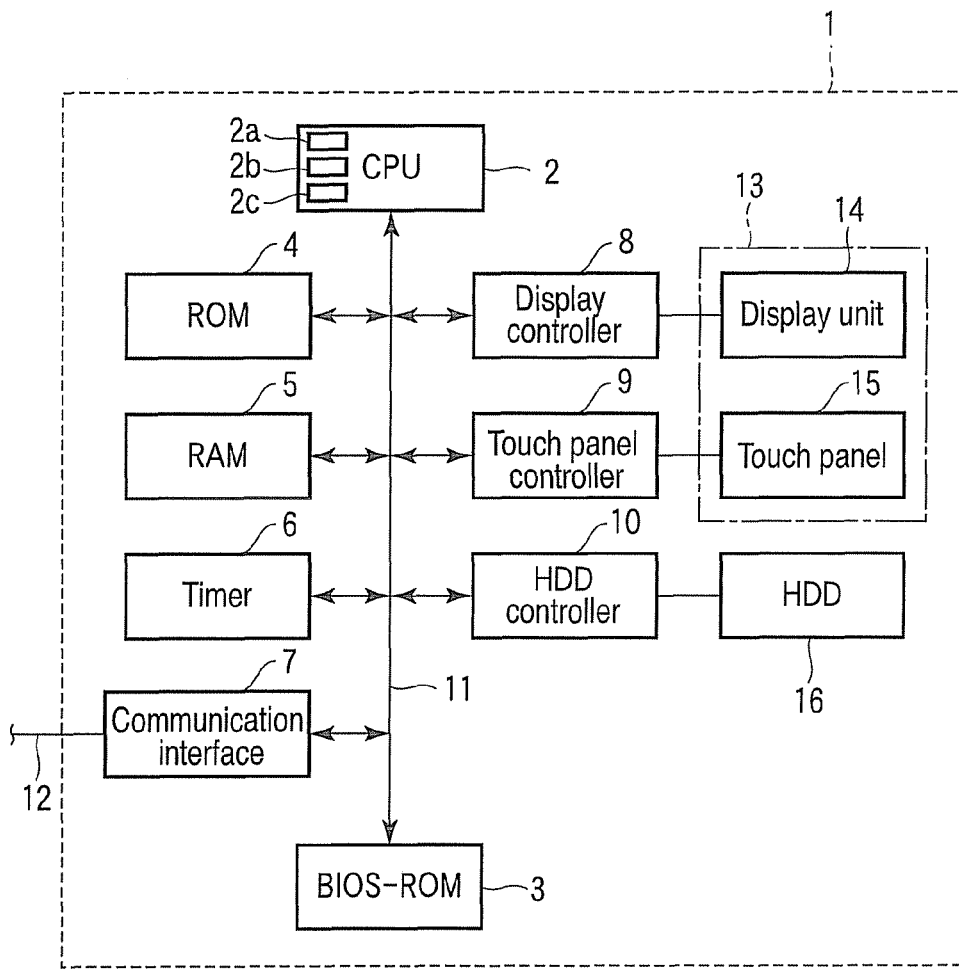
F I G. 1
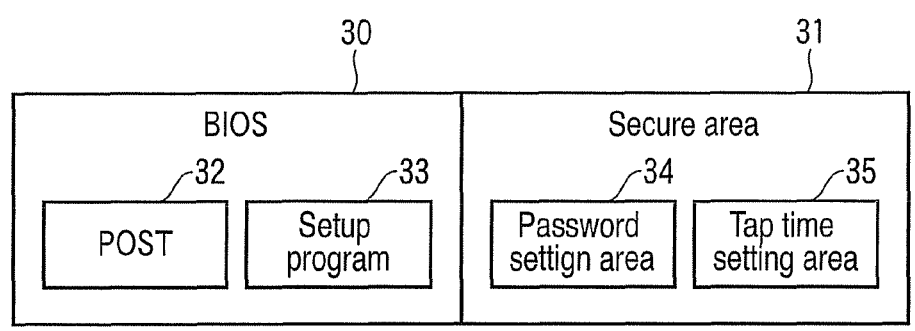
F I G. 2

INFORMATION PROCESSING APPARATUS AND SETUP PROGRAM EXECUTION METHOD

CROSS-REFERENCE TO RELATED APPLICATIONS

This application is based upon and claims the benefit of priority from Japanese Patent Application No. 2009-100212, filed Apr. 16, 2009, the entire contents of which are incorporated herein by reference.

FIELD

Embodiments described herein relate generally to an information processing apparatus which has a display device with a touch panel and has its OS (operating system) started up under the control of a BIOS (basic input/output system), and a method for executing a BIOS setup program.

BACKGROUND

Conventionally, system startup in an information processing apparatus such as a personal computer is executed under the control of a basic program called BIOS. In the startup under the BIOS, the OS is called after anomaly diagnosis and initialization of each device using a test program called POST (power-on self test) is carried out, for example, as disclosed in JP-A-2000-298579.

To carry out setting of this BIOS, a predetermined key provided on a keyboard as a peripheral device is pressed in a POST screen that appears immediately after power is turned on, as in a personal computer. Accordingly, a BIOS setup program is executed and a screen for setting up the BIOS is displayed on a display unit.

Recently, also in an information processing apparatus used for a specific purpose such as a POS (point of sales) terminal used for accounting in a retail store, startup of a system is executed under the control of a BIOS, as in a personal computer, and anomaly diagnosis and initialization of each device and calling of OS are carried out.

Some of such information processing apparatuses do not have a keyboard as an input device and are dependent on a display with a touch panel for operator's operation input. In order to set up the BIOS for the information processing apparatus of this type, a mechanical keyboard is connected to a communication interface such as a peripheral device connection port provided in the apparatus and a predetermined key is pressed as described above. Thus, a BIOS setup screen is displayed.

However, when BIOS setup is urgently needed, it takes considerable time to complete setting unless a dedicated keyboard is prepared. Therefore, there is a probability that the POS terminal cannot be used for sales services, causing a significant delay in dealing with customers.

Also, since the POS terminal handles highly confidential information including sales information of the store and customer information and is used in a store which unspecified people come in and out, security must be enhanced with respect to the setting of great importance such as BIOS setup.

However, it cannot be said that the security measures are sufficient as long as the BIOS setup screen is displayed via a simple keyboard operation as in an ordinary personal computer.

BRIEF DESCRIPTION OF THE DRAWINGS

FIG. 1 is a block diagram showing the configuration of essential parts of a POS terminal in a first embodiment.

FIG. 2 is a schematic view showing the data structure in a BIOS-ROM in the first embodiment.

DETAILED DESCRIPTION

Figure 3:
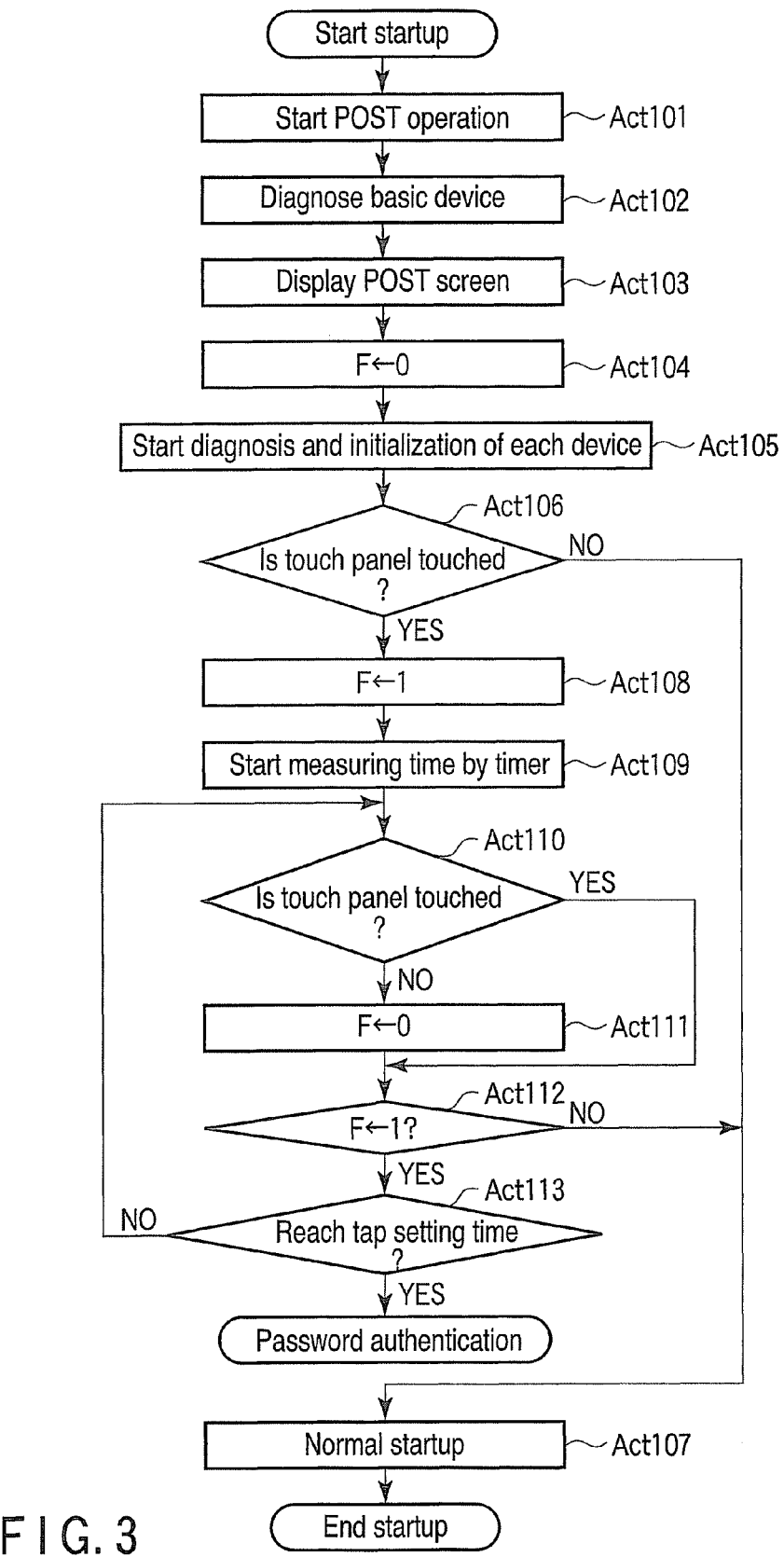
FIG. 3 is a flowchart showing startup in the first embodiment.

In general, according to one embodiment, an information processing apparatus comprising a display unit, a touch panel, a BIOS storage unit, and a setup program execution unit. The display unit displays various kinds of information. The touch panel is installed on a display screen of the display unit and used for input corresponding to a contact operation. The BIOS storage unit stores a BIOS (basic input/output system) to execute startup of an operating system. The setup program execution unit executes a setup program for the BIOS in response to that an input from the touch panel is detected during the execution of the startup based on the BIOS.

Hereinafter, a first embodiment will be described with reference to the drawings. In this embodiment, a POS terminal that is installed at a checkout counter in a retail store or the like and used for accounting of transactions is described as an example.

FIG. 1 is a block diagram showing the configuration of essential parts of a POS terminal 1 as an embodiment of an information processing apparatus. The POS terminal 1 is equipped with a CPU (central processing unit) 2 functioning as a control center. A BIOS-ROM (basic input/output system-read only memory) 3, a ROM (read only memory) 4, a RAM (random access memory) 5, a timer 6, a communication interface 7, a display controller 8, a touch panel controller 9, and a hard disk drive (HDD) controller 10 are connected to the CPU 2 via a bus line 11 such as an address bus or data bus, thus forming a control circuit of the POS terminal.

The ROM 4 stores fixed data such as a control program that is necessary for basic operation of the POS terminal 1. The RAM 5 forms various memory areas for working in accordance with processing situations. The timer 6 measures a predetermined time in accordance with a command from the CPU 2. The communication interface 7 controls data communication with a device connected via a communication cable 12.

The display controller 8 is connected with a display unit 14 of a touch panel-equipped display device 13 and controls the display unit 14 to selectively display various kinds of information. As the display unit 14, a CRT (cathode ray tube), LCD (liquid crystal display) or the like can be employed. The touch panel controller 9 is connected with a touch panel 15 of the touch panel-equipped display device 13, calculates the coordinates of a touch position on the basis of an electrical signal outputted in accordance with the position touched by a finger tip or touch pen on the touch panel 15, and notifies the CPU 2 of the calculated coordinates of the touch position. The hard disk drive controller 10 is connected with a hard disk drive (HDD) 16 storing an OS file and an application file and controls reading and writing of data from and to the drive 16.

The BIOS-ROM 3 as a BIOS storage unit includes a rewritable non-volatile memory such as a flash ROM in order to cope with update and setup of the BIOS. FIG. 2 is a schematic view showing the data structure in the BIOS-ROM 3. The BIOS-ROM 3 has a storage area for a BIOS 30 and a secure area 31. The BIOS 30 includes a POST 32 and a setup program 33. The secure area 31 includes a password setting area 34 and a tap time setting area 35.

The POST 32 is a test program that is executed when the BIOS 30 carries out anomaly diagnosis and initialization of each piece of hardware. The setup program 33 is a program to execute various setups related to the BIOS 30. The setups executed by the setup program 33 include, for example, setting with respect to management of power supplied to each unit, management of system date, management of an operation clock, management of power supplied to a peripheral device, control of an on-board device, and power management.

The secure area 31 is an area that requires special procedures for data reading and writing. Therefore, a user or an application cannot freely refer to or change data stored in the secure area 31. The password setting area 34 is an area where a password necessary for executing the setup program 33 is set. The password setting area 34 functions as a password storage unit in this embodiment. The tap time setting area 35 is an area where time for which the user should touch the touch panel 15 when executing the setup program from the state where the execution screen of the POST 32 is displayed, is set. The tap time setting area 35 functions as a setting time storage unit in this embodiment.

The CPU 2 executes programs stored in the ROM 4 or the like and thus functions as an error correction unit 2a, a password accepting unit 2b, and a setup program execution unit 2c.

In response to that an input from the touch panel 15 is detected during the execution of startup of the OS by the BIOS 30, the error correction unit 2a corrects an error between the coordinates indicating the position in an image displayed by the display unit 14 and the coordinates indicating the position of the input detected by the touch panel 15.

After the error is corrected by the error correction unit 2a, the password accepting unit 2b displays an operation key group for inputting a password on the display screen of the display unit 14 and accepts, as a password, information designated by operation keys displayed at the position where the input is detected by the touch panel 15.

If the password with its input accepted by the password accepting unit 2b matches the password stored in the password setting area 34, the setup program execution unit 2c executes the setup program 33.

Next, the startup of the POS terminal 1 configured as described above will be described.

When a power button (not shown) provided in the body is switched on by the user and operating power is supplied to the POS terminal 1, the CPU 2 reads out the BIOS 30 from the BIOS-ROM 3, executes the BIOS 30 and starts startup of the system. FIG. 3 is a flowchart showing the processing executed by the CPU 2 in the startup of the OS.

Figure 4:
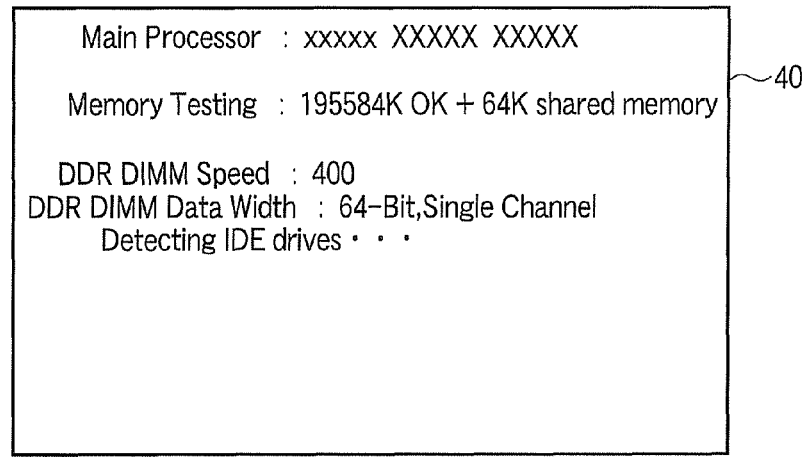
FIG. 4 is a schematic view showing an example of a POST screen in the first embodiment.

First, the CPU 2 starts the operation based on the POST 32 (Act 101). At this time, anomaly diagnosis and initialization of basic devices such as the CPU 2, the ROM 4, the RAM 5, the display controller 8, the touch panel controller 9, the display unit 14 and the touch panel 15 are carried out under the control of the POST 32 (Act 102). If the anomaly diagnosis and initialization of the basic devices are finished normally, the CPU 2 controls the display unit 14 via the display controller 8 and displays a POST screen 40 as an execution screen of the POST 32, shown in FIG. 4 (Act 103). In this screen 40, information about the devices on which anomaly diagnosis and initialization are completed and the like are displayed.

The CPU 2 then forms a flag F in the RAM 5 and sets its value at "0" (Act 104). After that, the CPU 2 starts anomaly diagnosis and initialization of devices on which anomaly diagnosis and initialization are not completed yet (Act 105). The devices on which anomaly diagnosis and initialization are executed in this processing include various devices not shown in FIG. 1 such as an on-board device and an external device.

Next, the CPU 2 determines whether or not the touch panel 15 is touched by the user while the POST screen 40 is displayed (Act 106). If the touch panel 15 is touched by the user while the POST screen 40 is displayed, the touch panel 15 outputs an electrical signal corresponding to the touch position. The touch panel controller 9 calculates the coordinates of the touch position in accordance with the electrical signal and notifies the CPU 2 of the calculated coordinates. If there is no such notification, the CPU 2 determines that the touch panel 15 is not touched (No in Act 106). Then, on completion of the anomaly diagnosis and initialization of each device, the CPU 2 proceeds with normal startup including the startup of the OS (Act 107).

Meanwhile, if there is a notification of the coordinates of the touch position from the touch panel controller 9, the CPU 2 determines that the touch panel 15 is touched (Yes in Act 106) and sets the value of the flag F formed in the RAM 5 to "1" (Act 108). The CPU 2 also starts measurement of time by the timer 6 (Act 109).

After that, the CPU 2 determines again whether the touch panel 15 is touched or not (Act 110). At this time, if the touch on the touch panel 15 by the user is already suspended, there is no notification of the coordinates of the touch position from the touch panel controller 9. In this case, the CPU 2 determines that the touch panel 15 is not touched (No in Act 110) and sets the value of the flag F to "0" (Act 111).

Meanwhile, if the user continues touching the touch panel 15, there is a notification of the coordinates of the touch position from the touch panel controller 9. In this case, the CPU 2 determines that the touch panel 15 is touched (Yes in Act 110) and keeps the value "1" of the flag F unchanged.

After thus confirming the touch on the touch panel 15, the CPU 2 determines whether the value of the flag F is set to "1" or not (Act 112). If the touch on the touch panel 15 by the user is already suspended as described above, the flag F is set to "0". At this time, the CPU 2 determines that the value of the flag F is not set to "1" (No in Act 112) and proceeds with normal startup on completion of the anomaly diagnosis and initialization of each device based on the POST 32 (Act 107).

Meanwhile, if the user continues touching the touch panel 15, the value of the flag F remains set to "1". Therefore, the CPU 2 determines that the flag F is set to "1" (Yes in Act 112). In this case, the CPU 2 compares the measured time by the timer 6 with a tap time set in the tap time setting area 35 provided in the secure area 31 of the BIOS-ROM 3 and determines whether or not the measured time by the timer 6 reaches the tap time set in the tap time setting area 35 (Act 113). If the measured time by the timer 6 does not reach the tap time set in the tap time setting area 35 (No in Act 113), the CPU 2 repeats the processing of Act 110 to Act 113 again.

If the user continues touching the touch panel 15, the measured time by the timer 6 eventually reaches the tap time set in the tap time setting area 35. In this case, the CPU 2 determines that the measured time by the timer 6 reaches the tap time set in the tap time setting area 35 (Yes in Act 113) and shifts to password authentication.

Next, the password authentication will be described.

Figure 5:
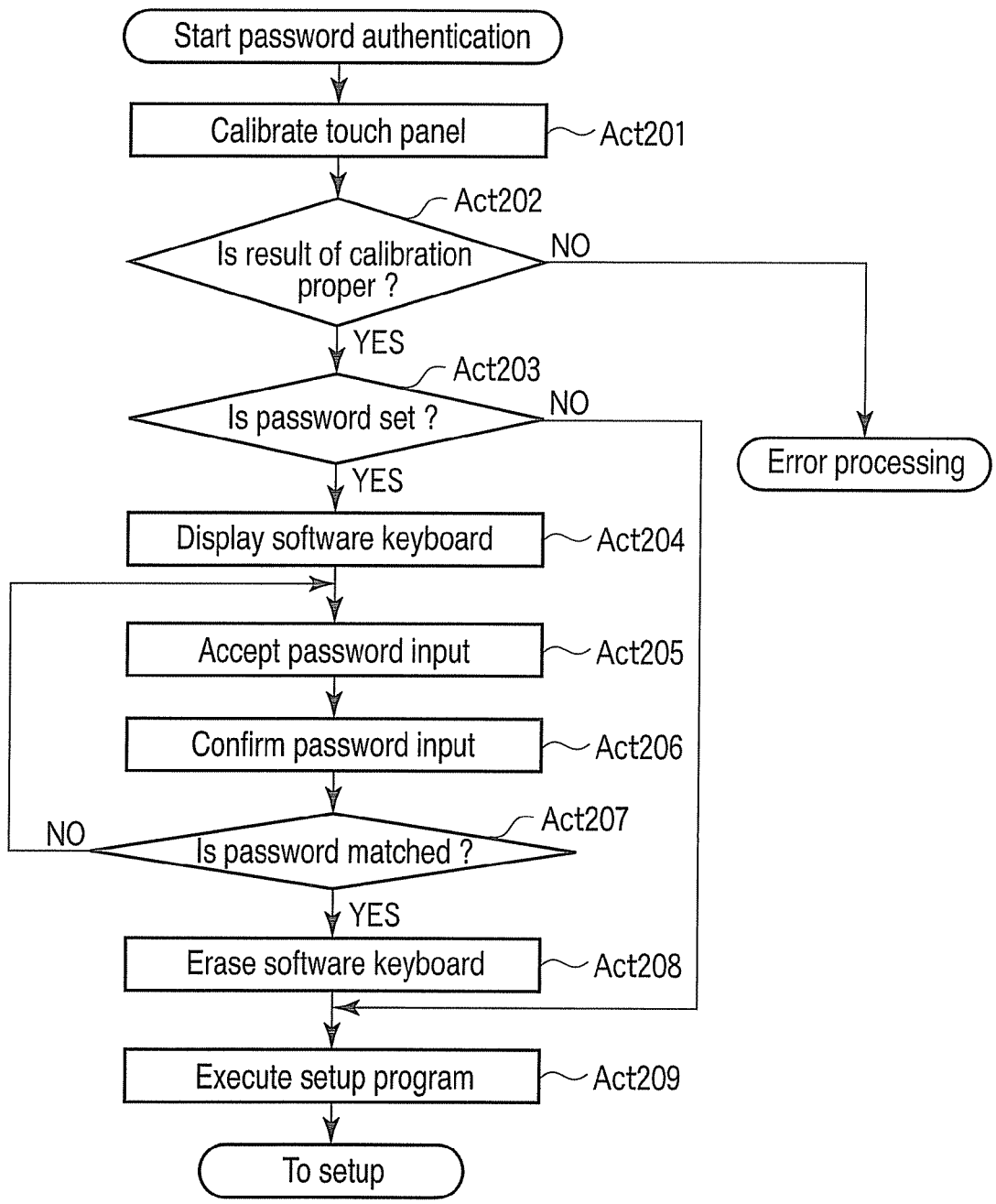
FIG. 5 is a flowchart showing password authentication in the first embodiment.

FIG. 5 is a flowchart showing the processing executed by the CPU 2 under the control of the BIOS 30 in the password authentication.

At the start of this processing, the CPU 2 carries out calibration of the touch panel 15 (Act 201). Calibration is the processing to confirm and correct an error between the displayed coordinates on the display unit 14 and the coordinates of the touch position on the touch panel 15.

Specifically, check marks are displayed at predetermined positions, for example, the four corners of the display screen of the display unit 14 and the user is prompted to touch each check mark. At this time, the coordinates of the touch position of each check mark calculated by the touch panel controller 9 on the basis of an electrical signal outputted by the touch panel 15 in accordance with the touch position is compared with the coordinates of the touch position set in advance in the BIOS 30, and if the error is within a correctable error range, a correction value to correct the error with is calculated and set in the touch panel controller 9. After receiving the setting of the correction value, the touch panel controller 9 notifies the CPU 2 of a value acquired as a result of correcting, with the correction value, the coordinates of the touch position calculated from the electrical signal outputted from the touch panel 15. On the other hand, if the error between the coordinates of the touch position of each check mark calculated by the touch panel controller 9 and the coordinates of the touch position set in advance in the BIOS 30 is not within the correctable error range, the calculation and setting of a correction value is not carried out.

After the touch panel 15 is calibrated, the CPU 2 determined whether the result of the calibration is proper or not, that is, whether the error is within the correctable range or not (Act 202). If the error is not within the correctable range, the CPU 2 determines that the result of the calibration is not proper (No in Act 202) and causes the display unit 14 via the display controller 8 to display an error message indicating that the result of the calibration is not proper. The CPU 2 then executes error processing such as resetting the startup.

Figure 6:
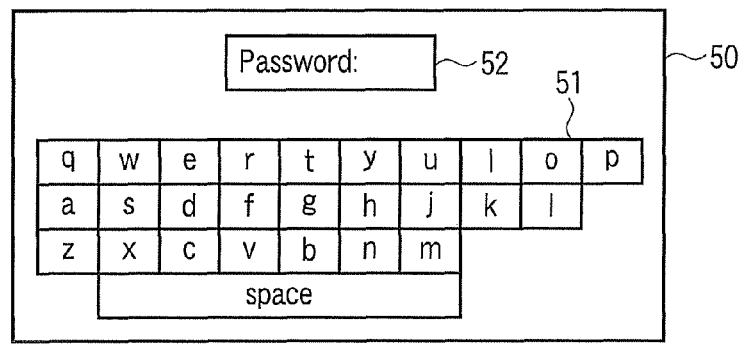
FIG. 6 is a schematic view showing an example of a software keyboard in the first embodiment.

Meanwhile, if the error is within the correctable range, the CPU 2 determines that the result of the calibration is proper (Yes in Act 202). The CPU 2 determines whether or not a password is set in the password setting area 34 stored in the secure area 31 of the BIOS-ROM 3 (Act 203). If a password is set in the password setting area 34 (Yes in Act 203), the CPU 2 causes the display unit 14 to display a software keyboard 50 shown in FIG. 6 via the display controller 8. The software keyboard 50 has an input key group 51 including alphabetical ("a" to "z") keys and a "space" key, and a password display section 52 which shows a letter string corresponding to keys operated by the user, of the input key group 51.

In the state where the software keyboard 50 of such a configuration is displayed on the display unit 14, the CPU 2 accepts input of a password based on a touch operation on the software keyboard 50 (Act 205). When it is confirmed that a password having a predetermined number of letters is inputted by the user's operation (Act 206), the CPU 2 compares the inputted password with the password set in the password setting area 34 and determines whether these passwords match each other or not (Act 207). If the inputted password does not match the password set in the password setting area 34 (No in Act 207), the CPU 2 causes the display unit 14 to display a message indicating the password mismatch, clears the inputted password and then accepts input of a password again (Act 205).

Meanwhile, if the inputted password matches the password set in the password setting area 34 (Yes in Act 207), the CPU 2 controls the display unit 14 via the display controller 8 to erase the software keyboard 50 from the display screen (Act 208). After that, the CPU 2 executes the setup program 33 (Act 209).

If no password is set in the password setting area 34 (No in Act 203), the CPU 2 executes the setup program 33 without displaying the software keyboard 50 or the like (Act 209).

After the setup program 33 is executed, a BIOS setup menu screen is displayed on the display unit 14 under the control of the program 33. The user can execute various setups with respect to the BIOS 30 by touch operation on this screen. The setting with respect to the secure area 31 including change of the password set in the password setting area 34 or change of the tap time set in the tap time setting area 35 is carried out via the same screen.

If the completion of the BIOS setup is declared by predetermined touch operation on the screen in the state where various setups are designated via the BIOS setup menu screen, each area in the BIOS-ROM 3 is updated with the designated setup contents. Then, the startup of the POS terminal 1 is suspended and the system is restarted. Startup is then carried out in the state where the update contents are reflected.

As described above, the POS terminal 1 in this embodiment executes the setup program of the BIOS 30 in response to that an input from the touch panel 15 is detected while the startup of the system is being executed and the POST screen 40 is displayed on the display unit 14. Thus, since no such work as connecting a mechanical keyboard to the POS terminal 1 is required, a situation where BIOS setup takes time, causing a significant delay in coping with customers, can be prevented.

The setup program 33 is not executed until the touch continuation time on the touch panel 15 reaches the tap time set in the tap time setting area 35. Thus, a person who does not know the tap time set in the tap time setting area 35 cannot execute the setup program and therefore security of the POS terminal 1 can be improved. Such an effect can be further enhanced by setting a password in the password setting area 34.

If a relatively long tap time is set in the tap time setting area 35, an erroneous short-time touch on the touch panel 15 does not cause execution of the setup program 33. Therefore, a situation where the setup program 33 is executed because of an erroneous operation by the user can be prevented.

Next, a second embodiment will be described with reference to the drawings.

The second embodiment is different from the first embodiment in that the setup program 33 is executed on the basis of the number of times the touch panel 15 is touched, instead of the time for which the touch panel 15 continues being touched. The configuration of essential parts of the POS terminal 1, the operation of the password authentication and the like are similar to those in the first embodiment. The same parts are denoted by the same reference numerals and will not be described further in detail.

Figure 7:
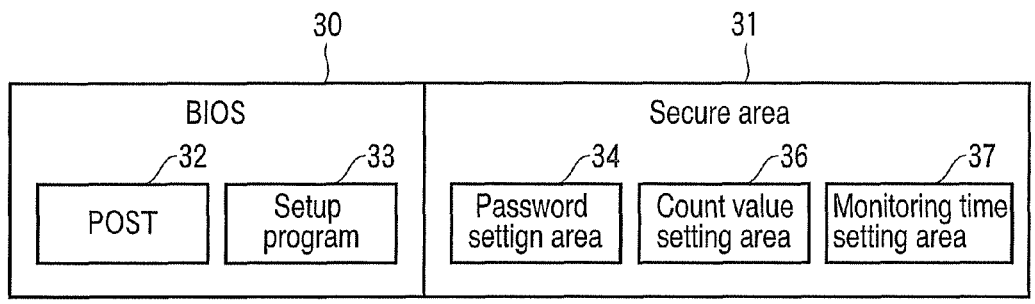
FIG. 7 is a schematic view showing the data structure in a BIOS-ROM in a second embodiment.

FIG. 7 is a schematic view showing the data structure in the BIOS-ROM 3 in this embodiment. The secure area 31 includes a count value setting area 36 and a monitoring time setting area 37, instead of the tap time setting area 35 in the first embodiment. The count value setting area 36 is an area where a count value Nmax is set, which is the number of times the user should touch the touch panel 15 when executing the setup program from the state where the execution screen of the POST 32 is displayed. The count value setting area 36 functions as a count value storage unit in this embodiment. The monitoring time setting area 37 is an area where a monitoring time is set, during which the number of times the touch panel 15 is touched is counted in the state where the execution screen of the POST 32 is displayed.

Figure 8:
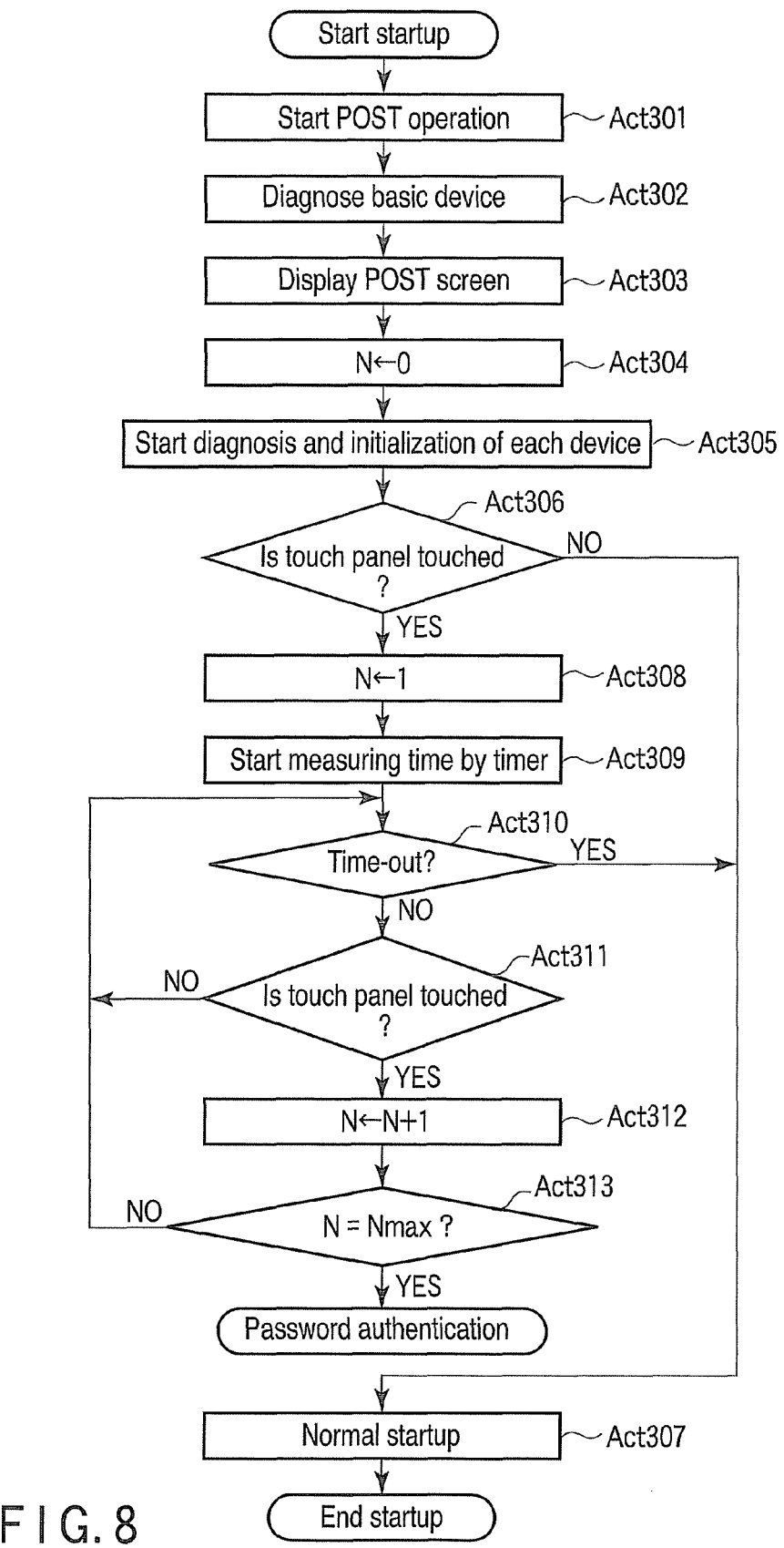
FIG. 8 is a flowchart showing startup in the second embodiment.

FIG. 8 is a flowchart showing the processing executed by the CPU 2 in the startup of the operating system. First, the CPU 2 starts operation based on the POST 32 (Act 301), as in the first embodiment. The CPU 2 carries out initialization or the like of basic devices (Act 302) and causes the display unit 14 to display the POST screen 40 (Act 303).

The CPU 2 also forms a counter N in the RAM 5 and sets its value to "0" (Act 304). After that, the CPU 2 starts anomaly diagnosis and initialization of devices on which anomaly diagnosis and initialization are not completed yet (Act 305).

Next, the CPU 2 determines whether or not the touch panel 15 is touched by the user while the POST screen 40 is displayed (Act 306). If there is no notification of the coordinates of the touch position from the touch panel 15, the CPU 2 determines that the touch panel 15 is not touched (No in Act 306) and proceeds with normal startup including the startup of the OS on completion of the anomaly diagnosis and initialization of each device (Act 307).

Meanwhile, if there is a notification of the coordinates of the touch position from the touch panel controller 9, the CPU 2 determines that the touch panel 15 is touched (Yes in Act 306) and sets the value of the counter N formed in the RAM 5 to "1" (Act 308). The CPU 2 then starts measuring time by the timer 6 (Act 309).

After that, the CPU 2 compares with measured time by the timer 6 with the monitoring time set in the monitoring time setting area 37 of the BIOS-ROM 3 and determines whether or not the measured time by the timer 6 reaches the monitoring time set in the monitoring time setting area 37 (Act 310). If the measured time by the timer 6 reaches the monitoring time (Yes in Act 310), the CPU 2 proceeds with normal startup including the startup of the OS (Act 307).

Meanwhile, if the measured time by the timer 6 does not reach the monitoring time (No in Act 310), the CPU 2 determines whether, after the touch panel 15 is touched previously and the counter N is set to the current value, the user's finger or touch pen is temporarily released from the touch panel 15 and then the touch panel 15 is touched again or not (Act 311). Specifically, the determination in Act 311 is made in accordance with whether, after the touch panel 15 is touched previously, the notification of the coordinates of the touch position from the touch panel controller 9 is temporarily suspended and then this notification is resumed or not.

If the touch panel 15 is not touched after the touch panel 15 is touched previously or if the touch panel 15 continues being touched (No in Act 311), the CPU 2 returns to the processing of Act 310.

Meanwhile, if, after the touch panel 15 is touched previously and the counter N is set to the current value, the user's finger or touch pen is temporarily released from the touch panel 15 and then the touch panel 15 is touched again (Yes in Act 311), the CPU 2 increments the value of the counter N by 1 (Act 312). Next, the CPU 2 determines whether the value of the counter N reaches the count value Nmax set in the count value setting area 36 or not (Act 313). If the value of the counter N does not reach the count value Nmax, the CPU 2 returns to the processing of Act 310.

If the user intermittently touches the touch panel 15, the value of the counter N eventually reaches the count value Nmax set in the count value setting area 36 (Yes in Act 313). In this case, the CPU 2 shifts to the password authentication shown in FIG. 5. As described above, in this embodiment, if the number of times the touch panel 15 is intermittently touched in the state where the POST screen 40 is displayed reaches the count value Nmax set in the count value setting area 36, the processing shifts to the password authentication. In such case, a person who does not know the count value Nmax set in the count value setting area 36 cannot execute the setup program and therefore security of the POS terminal 1 can be improved, as in the first embodiment.

As a matter of course, similar advantages to those of the first embodiment can be achieved.

In the embodiments, the examples of applying the invention to the POS terminal 1 are described. However, without being limited to these embodiments, the invention may also be applied to other kinds of information processing apparatuses.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a display unit which displays various kinds of information;
a touch panel installed on a display screen of the display unit and used for input corresponding to a contact operation;
a BIOS storage unit in which a BIOS (basic input/output system) to execute startup of an operating system is stored;
a password storage unit which stores a password;
an error correction unit which, when an input from the touch panel is detected during execution of the startup based on the BIOS, in a case where an error between coordinates indicating a position of an image display by the display unit and coordinates indicating the position of the input detected by the touch panel is within a correctable error range, corrects the error, and, in a case where the error is not within range, resets the startup;
a password accepting unit which accepts input of a password if the password is stored in the password storage unit after correction is made by the error correction unit; and
a setup program execution unit which executes a setup program for the BIOS when a password is not stored in the password storage unit after correction is made by the error correction unit, and the password for which input has been accepted by the password accepting unit matches with the password stored in the password storage unit.

2. The apparatus according to claim 1, wherein the BIOS has a POST (power-on self test) program, and
The error correction unit corrects the error or resets the startup in response to that the input from the touch panel is detected while an execution screen of the POST program is displayed on the display screen of the display unit.

3. The apparatus according to claim 1, further comprising:
a timer which measures a continuation time of the input in response to that the input from the touch panel is detected during the execution of the startup based on the BIOS; and
a setting time storage unit which stores a setting time to be compared with the measured time by the timer;
wherein the error correction unit corrects the error or resets the startup in response to that the measured time by the timer reaches the setting time stored in the setting time storage unit.

4. The apparatus according to claim 1, wherein the password accepting unit has an operation key group for inputting a password displayed on the display screen of the display unit and accepts, as a password, information designated by an operation key displayed at a position where the input is detected by the touch panel.

5. The apparatus according to claim 4,
wherein the password accepting unit has the operation key group displayed on the display screen of the display unit after the error is corrected by the error correction unit.

6. The apparatus according to claim 1, wherein the setup program accepts designation of a content that should be set up via an operation on the touch panel, and updates the information stored in the BIOS storage with the content the designation of which is accepted.

7. The apparatus according to claim 1, further comprising:
a counter unit which counts the number of times of the input in response to that the input from the touch panel is intermittently detected during the execution of the startup based on the BIOS; and
a count value storage unit which stores a count value to be compared with a count value of the counter unit;
wherein the error correction unit corrects the error or resets the startup in response to that the count value of the counter unit reaches the count value stored in the count value storage unit.

8. A method for executing a setup program for a BIOS in an information processing apparatus in which startup of an operating system is executed on the basis of the BIOS stored in a BIOS storage unit and in which a touch panel for carrying out input corresponding to a contact operation is installed on a display screen of a display unit for displaying various kinds of information, the method comprising:
detecting an input from the touch panel during the execution of the startup based on the BIOS;
storing a password in a password storage unit;
when the input from the touch panel is detected during execution of the startup based on the BIOS, in a case where an error between coordinates indicating a position of an image displayed by the display unit and coordinates indicating the position of the input detected by the touch panel is within a correctable error range, correcting the error, and, in a case where the error is not within the range, resetting the startup;
accepting input of a password file if the password is stored in the password storage unit after correction is made when the input from the touch panel is detected during execution of the startup based on the BIOS; and
executing the setup program for the BIOS when a password is not stored in the password storage unit after correction is made when the input from the touch panel is detected during execution of the startup based on the BIOS, and the password for which input has been accepted matches with the password stored in the password storage unit.

9. A method for executing a setup program for a BIOS in an information processing apparatus in which startup of a system is executed on the basis of the BIOS stored in a BIOS storage unit and in which a touch panel for carrying out input corresponding to a contact operation is installed on a display screen of a display unit for displaying various kinds of information, the method comprising:
detecting an input from the touch panel during the execution of the startup based on the BIOS;
measuring a continuation time of the input by a timer in response to that the input from the touch panel is detected;
storing a password in a password storage unit;
when the input from the touch panel is detected during execution of the startup based on the BIOS, in a case where an error between coordinates indicating a position of an image displayed by the display unit and coordinates indicating the position of the input detected by the touch panel is within a correctable error range, correcting the error, and, in a case where the error is not within the range, resetting the startup;
accepting input of a password file if the password is stored in the password storage unit after correction is made when the input from the touch panel is detected during execution of the startup based on the BIOS; and
executing the setup program for the BIOS when a password is not stored in the password storage unit after correction is made when the input from the touch panel is detected during execution of the startup based on the BIOS, and the password for which input has been accepted matches with the password stored in the password storage unit,
wherein when the input from the touch panel is detected during execution, correcting the error or resetting the startup in response to that the measured time by the timer reaches a time stored in a predetermined storage unit.

* * * * *